3,406,222
STABILIZED POLYOXYMETHYLENE
COMPOSITIONS
Henry Moncure, Jr., Marietta, Ohio, assignor to E. I. du Pont de Nemours and Company, Wilmington, Del., a corporation of Delaware
No Drawing. Filed July 8, 1966, Ser. No. 563,717
7 Claims. (Cl. 260—857)

ABSTRACT OF THE DISCLOSURE

Polyoxyethylenes may be stabilized by the addition of 0.001–1% by weight of the component bis(phenylisopropylidene)diphenylamine. The composition may optionally contain polyamides and ultraviolet screening agents as exemplified by benzotriazole, cinnamonitrile and O-hydroxy benzophenone.

---

This invention relates to polyoxymethylene, and, more particularly, to polyoxymethylene compositions which have been stabilized by uniform incorporation therein of an additive.

The term polyoxymethylene is used herein to mean acetal homopolymer diethers and diesters as well as acetal copolymers, wherein alkylene groups containing at least one carbon-to-carbon linkage are present in the backbone of said copolymers to extent of 0.3–5.0 mole percent. The term composition is used herein to mean polyoxymethylene by additive(s).

Polyoxymethylenes exhibit good color performance on heat aging, that is, they do not darken significantly, but marked weight loss occurs. Aromatic amines known previously have been incorporated into polyoxymethylene to yield compositions with improved weight-loss performance on heat aging, but the color characteristics of the latter compositions are poor, in that extreme yellowing and darkening occurs. The polyoxymethylene compositions of this invention surprisingly have a lesser tendency to yellow and darken than do the previously known aromatic-amine modified polyoxymethylene compositions, both initially and on heat aging. Thus, this invention provides polyoxymethylene compositions with an exceptional balance of physical properties, being of excellent heat stability and having good color performance, low cost, low toxicity, and good melt stability.

The compositions of this invention comprise normally solid synthetic polyoxymethylene with a number average molecular weight of at least 15,000, and about 0.001–1% (by weight of said polyoxymethylene) of the compound bis(phenylisopropylidene)diphenylamine, as a heat stabilizer, the latter being uniformly distributed through the polyoxymethylene.

The stabilizer of this invention, herein referred to as BPDP, has the following molecular structure:

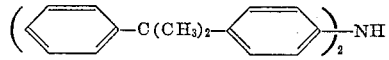

BPDP is available commercially from the U.S. Rubber Company under the trade name "Nauguard 445."

The amount of BPDP in the polyoxymethylene compositions of this invention can be in the range of 0.001–1.0% of the weight of the polyoxymethylene itself, preferably 0.01–0.2% thereof.

BPDP can be intimately blended with the polyoxymethylene by any one of a number of methods. A convenient way is to mechanically mix a solution of the stabilizer in a volatile organic solvent, such as acetone or methanol, which is not a solvent for the polyoxymethylene, with a powder of polyoxymethylene, followed by evaporation of the solvent. An alternate method of incorporation is to dissolve the BPDP in a volatile organic solvent which is also at least a partial solvent for the polyoxymethylene and to steep the polymer in this solution, followed by removal of the solvent by evaporation, desirably under reduced pressure. As an alternative, the stabilizer as such can be added to the polymer and the mixture blend homogenized by milling, plasticating, or other mixing at a temperature above the melting point of the polymer. As still another alternative, the composition of this invention can be made by dissolving BPDP in a solvent for the polymer and adding that solution to a solution of the polymer in the same solvent.

The preferred methods of incorporation of BPDP are those whereby a solution of the BPDP is mechanically mixed with a polyoxymethylene powder, or whereby BPDP as such is added to the polymer followed by blend homogenization by extrustion.

The stabilized compositions of this invention are useful for conversion to films, sheets, fibers, filaments, bristles, molded articles, and the like, by melt extrusion, injection molding, compression molding, and other fabrication methods known to the art.

Other additives can be blended with the stabilized compostions of this invention, if desired. For example, it may be desirable to add ultraviolet screeners such as orthohydroxybenzophenones such as those disclosed in U.S. Patent 3,050,500, issued to L. T. Sherwood, Jr. on Aug. 21, 1962; cinnamonitriles such as those disclosed in U.S. Patent 3,081,280, issued to D. P. Carlson on Mar. 12, 1963; benzotriazoles such as those disclosed in British Patent Specifications 991,142, 991,204, and 991,320, issued to Geigy Chemical Company. The level of such ultraviolet screeners is usually up to about 5% of the weight of the polyoxymethylene itself.

Polyamides can also be added to the stabilized compositions of this invention in amounts up to about 5% of the weight of the polyoxymethylene. Especially useful polyamide additives are the synthetic superpolyamides of U.S. Patent 2,993,025, issued to R. G. Alsup and P. E. Lindvig on July 18, 1961.

The following examples are presented to illustrate but not to restrict the present invention. Percentages and parts are expressed by weight unless otherwise noted.

The base stability of the polymer as referred to in the examples was determined by placing 2 parts (by weight) of stabilized polyoxymethylene in 1 part of tri-n-propylamine and 49 parts of benzyl alcohol. The mixture was sparged with notrogen at room temperature for 15 minutes, heated up to 160° C. to dissolve the ploymer, then sparged at 160° C. for 30 minutes with a slow stream of nitrogen. The flow of nitrogen was then increased and the solution allowed to cool. The polymer precipitated while the solution temperature was still above 100° C., was filtered off, washed with acetone, and vacuum dried at 70° C. for 16 hours. The ratio of the weight of the polymer recovered to the initial weight of polymer, times one hundred, yields the percentage base stability of the polymer.

The thermal stability of the melt (in an inert atmosphere) was measured by the gas index (GI) test as described in U.S. Patent 3,081,280, issued to D. P. Carlson on Mar. 12, 1963. The numerical valve of GI is 3.7 times the milliliters of gas evolved per gram of polymer per 15 minutes elapsed time at 231° C.

The oxidative or heat stability of the composition was determined by measuring the weight loss of a sample thereof in a circulating air oven at 125° C. as a function of time.

Color properties were determined before and after heat aging upon compression-molded films of 10-mil thickness. A Manufacturers Engineering and Equipment Corporation Colormaster Differential Colorimeter model 4 was used to determine the yellowness index (YI) and lightness index (LI). YI is calculated by the following equation:

$$YI = R - B/G \times 100$$

wherein R is the red reflectance, B is the blue reflectance, and G is the green reflectance. The lower the YI the less yellow (and hence more white) the sample. LI is a measure of how white the sample is and is identical to the G value determined as above. The higher the LI, the whiter (and hence less brown or gray) the sample. The results of actual visual inspection of aged samples is also reported to indicate qualitatively the presence or absence of spots (Table 1).

EXAMPLE I–VI

A high molecular weight polyoxymethylene homopolymer was prepared according to Example 7 of U.S. Patent 2,994,687, issued to H. H. Goodman and L. T. Sherwood on August 1, 1961.

The polymer was then acetylated according to the general method of Example 41 of U.S. Patent 2,998,409, issued to S. Dal Nogare and J. O. Punderson on Aug. 29, 1961. The product had a preponderance of its chain ends terminated by acetyl groups. Control A (Table 1) lists the heat stability (weight loss) and film color properties both before and after aging of the unmodified acetylated product.

An acetone solution of BPDP was then added to the polymer powder (average particle size about 200 microns) and the mixture was stirred (the weight percent of the additive is stated in terms of the percentage of the weight of the polyoxymethylene). The solvent was then allowed to evaporate and the composition was dried in air for several days. Small portions of the composition were then compression-molded at 200° C. and 2,000 p.s.i. into a film of thickness 10 mils.

In Table 1, Examples I–VI list the properties of the composition to which various levels of BPDP had been added. The GI of the composition of Example VI (before aging) was found to be 13.8. Controls B and C are compositions of polyoxymethylene and diphenylbenzidine.

EXAMPLES VII–VIII

A high molecular weight polyoxymethylene of the type described in Example I was alkylated according to the general procedure of Example 1 of U.S. Patent 3,192,182, issued to N. Brown and W. E. Grigsby on June 29, 1965. The resulting polyoxymethylene homopolymer had a preponderance of its chains terminated by alkyl groups.

The alkylated product was then treated at elevated temperature to decompose any polymeric chains not having alkyl groups on both terminal valences. Specifically, superheated steam was passed over guanidine carbonate held at 170° C. and the mixture of vapors passed through the polymer. The properties of the resultant diether polymer (which had a base stability greater than 99%) are found in Table 1 as Control D.

The properties of the base-stabilized product to which the stated levels of BPDP had been added as in Example I are found in Table 1 (Examples VII and VIII). Properties of a composition of the same polyoxymethylene and diphenylbenzidine are found in Table 1 as Controls E and F.

The GI of the composition of Example VIII (before aging) was found to be 19.9.

EXAMPLE IX

A polyoxymethylene copolymer containing 1.4 mole percent ethylene oxide units and having a base stability of 92% was base-stabilized using guanidine carbonate as in Example VII, except that the temperature of the treatment was about 160° C. The resultant polymer had a base stability of over 99%.

In Table 1 are listed physical properties of the base-stabilized copolymer as is (Control G), with 0.05% of BPDP (Example IX), and with 0.05% of diphenylbenzidine (Control H).

The GI of the composition of Example IX was found to be 12.0.

TABLE 1.—STABILIZED POLYOXYMETHYLENE COMPOSITIONS

| Example | Additive | | Before aging (color of film) | | After aging (air, 125° C.) | | | | |
| --- | --- | --- | --- | --- | --- | --- | --- | --- | --- |
| | Type | Amount (percent) | YI | LI | Duration of aging (da.) | Wt. loss (percent) | Color of film | | |
| | | | | | | | YI | LI | Visual* |
| I | BPDP | 2.0 | 6.2 | 82.9 | 4 | 0.31 | 89.6 | 63.7 | Y |
| II | BPDP | 1.0 | | | 4 | 0.38 | 55.4 | 77.8 | Y |
| III | BPDP | 0.5 | | | 4 | 0.38 | 35.6 | 81.6 | Y |
| IV | BPDP | 0.2 | | | 4 | 0.31 | 15.8 | 83.1 | W |
| V | BPDP | 0.1 | | | 4 | 0.32 | 10.2 | 83.4 | W |
| VI | BPDP | 0.05 | 3.5 | 83.9 | 4 | 0.20 | 8.0 | 84.0 | W |
| | | | | | 25 | 0.45 | | | |
| | | | | | 72 | 0.90 | 30.6 | 69.8 | Y |
| A | | | 4.0 | 84.5 | 4 | 0.75 | 5.9 | 84.9 | W |
| | | | | | 25 | 1.55 | | | |
| | | | | | 72 | 3.28 | 17.7 | 72.0 | C |
| B | DPB | 2.0 | 30.1 | 73.8 | 4 | 2.5 | 128.3 | 12.5 | B |
| C | DPB | 0.05 | 6.3 | 84.0 | 4 | 0.21 | 29.8 | 73.9 | C, S |
| | | | | | 25 | 0.49 | 30.8 | 66.8 | C, S |
| VII | BPDP | 2.0 | 2.6 | 85.6 | 4 | 0.46 | 94.2 | 63.0 | Y |
| VIII | BPDP | 0.05 | 1.8 | 85.9 | 4 | 0.28 | 17.2 | 81.7 | W |
| | | | | | 25 | 0.48 | | | |
| | | | | | 72 | 1.02 | 31.7 | 68.1 | Y |
| D | | | 2.0 | 85.0 | 4 | 0.48 | 6.3 | 84.1 | W |
| | | | | | 25 | 1.01 | | | |
| | | | | | 72 | 2.56 | 11.2 | 81.5 | W |
| E | DPB | 2.0 | 13.6 | 78.8 | 4 | 0.22 | 86.3 | 43.5 | Y |
| F | DPB | 0.05 | 3.1 | 84.3 | 4 | 0.27 | 31.2 | 70.7 | C, S |
| | | | | | 25 | 0.51 | 36.2 | 51.9 | C, S |
| IX | BPDP | 0.05 | 4.8 | 82.3 | 4 | 0.25 | 17.2 | 78.8 | W |
| | | | | | 25 | 0.37 | | | |
| | | | | | 72 | 0.62 | 43.7 | 64.0 | T |
| G | | | 5.0 | 83.2 | 4 | 0.60 | 15.3 | 81.8 | W |
| | | | | | 25 | 1.07 | | | |
| | | | | | 72 | 1.63 | 27.5 | 75.5 | C |
| H | DPB | 0.05 | 5.9 | 83.8 | 4 | 0.28 | 26.9 | 74.3 | C, S |
| | | | | | 25 | 0.38 | | | |
| | | | | | 72 | 0.52 | 45.9 | 64.0 | T, S |

*These data refer to the appearance of the sample on visual inspection.
Y is yellow, W is white, C is cream, B is brown and T is tan.
S indicates the presence of dark spots in the sample.

EXAMPLE X

An acetylated polyoxymethylene homopolymer of Example I was modified with 0.05% BPDP and 0.75% of a synthetic superpolyamide of the following composition (expressed as percentage of monomer in total monomer): 41.3% polycaprolactam, 38.6% polyhexamethylene adipamide, and 28.7% polyhexamethylene sebacamide. These components were blended for 30 minutes, then extruded at 200-210° C. The extrudate was cut to a molding powder, then injection molded at 200–210° C. into 8½-inch tensile bars according to ASTM Method D–638–60T. The tensile bars were placed in a circulating air oven at 125° C. and removed periodically to determine weight loss. The results are found in Table 2.

TABLE 2.—HEAT STABILITY OF POLYAMIDE-MODIFIED COMPOSITION

| Duration at 125° C. (da.): | Weight loss (percent) |
|---|---|
| 15 | 0.24 |
| 25 | 0.29 |
| 70 | 0.62 |
| 138 | 2.0 |
| 180 | 4.0 |

From the examples it is seen that the stabilized compositions of this invention have markedly better heat-aging characteristics than the polyoxymethylene itself. Moreover, the color characteristics of the compositions of this invention are surprisingly good, whereas, the color characteristics of the same polymers modified with one of the base aromatic amine stabilizers heretofore known are quite inferior to both the compositions of this invention, and, of course, to the unstabilized polymer.

Example X concerns a composition comprising a polyoxymethylene modified with both BPDP and a superpolyamide stabilizer. The data were obtained on tensile bars which had been injection molded after extrusion. Polyoxymethylene unmodified by these two additives could not have conveniently even been made into such bars since marked decomposition with evolution of formaldehyde would have occurred under the molding conditions detailed in Example X.

The modified polyoxymethylene compositions of this invention have the advantage, in addition to those mentioned above, that the cost of BPDP is much less than that of other aromatic amine stabilizers, being less than that of diphenylbenzidine. Secondly, although aromatic amines are recognized to be toxic, para-phenylenediamine being a known strong cause of allergic-contact dermatitis, BPDP has much lower toxicity. It is thought that methyl substitution in the para position prevents the formation of quinone-type structures and, in turn, provides a product with lower toxicity.

The foregoing detailed description has been given for clearness of understanding. The invention is not limited to the exact details shown and described since obvious modifications will occur to those skilled in the art.

I claim:

1. A heat stablized polyoxymethylene composition with improved color stability, which comprises a normally solid synthetic polyoxymethylene with a number average molecular weight of at least 15,000; and about 0.001–1% by weight of said polyoxymethylene, of the compound bis (phenylisopropylidene) diphenylamine as a heat stabilizer; said thermally stabilized polyoxymethylene composition being characterized by the fact that said composition exhibits a greater degree of heat stability than does said polyoxymethylene in the absence of said bis(phenylisopropylidene)diphenylamine.

2. The composition according to claim 1 wherein the weight of the bis(phenylisopropylidene)diphenylamine is about 0.01–0.2% by weight of said polyoxymethylene.

3. The composition of claim 1 also comprising up to about 5% of an ultraviolet screener.

4. The composition of claim 3 wherein said ultraviolet screener is a benzotriazole.

5. A composition of claim 3 wherein said ultraviolet screener is a cinnamonitrile.

6. The composition of claim 3 wherein said ultraviolet screener is an ortho-hydroxybenzophenone.

7. The composition of claim 1 also comprising up to about 5% of a synthetic superpolyamide.

References Cited

UNITED STATES PATENTS 2,920,059   1/1960   MacDonald _____ 260—45.9

MURRAY TILLMAN, *Primary Examiner.*

P. LIEBERMAN, *Assistant Examiner.*

UNITED STATES PATENT OFFICE
CERTIFICATE OF CORRECTION

Patent No. 3,406,225                                    October 15, 1968

Daniel S. Raden

It is certified that error appears in the above identified patent and that said Letters Patent are hereby corrected as shown below:

In the heading to the printed specification, line 2, "PROSPHORUS" should read -- PHOSPHORUS --. Column 1, lines 16 to 23, the right-hand portion of the formula reading Column 4, line 10, "$C_{14}H_{29}Cl_6P$" should read -- $C_{14}H_{19}Cl_6O_6P$ --.
Column 5, line 45, "ethylene" should read -- propylene --.
Column 7, lines 52 to 59, the right-hand portion of the formula reading

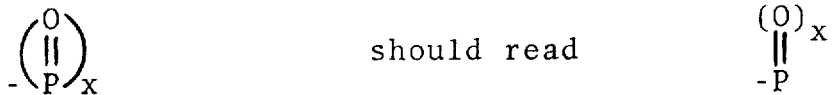

Column 8, lines 53 to 59, the right-hand portion of the formula reading

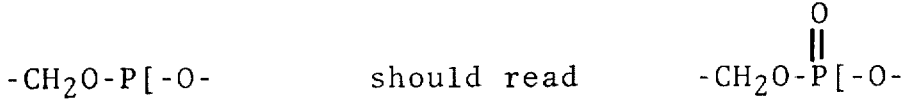

Signed and sealed this 10th day of March 1970.

(SEAL)
Attest:

EDWARD M. FLETCHER, JR.                        WILLIAM E. SCHUYLER, JR.
Attesting Officer                                   Commissioner of Patents